United States Patent

[11] 3,633,752

[72] Inventor Alfred J. Kurpgeweit
Route # 4, P.O. Box 123-F, Yakima, Wash. 98902
[21] Appl. No. 864,267
[22] Filed Sept. 26, 1969
[45] Patented Jan. 11, 1972

[54] IRRIGATION WATER SCREEN
1 Claim, 6 Drawing Figs.
[52] U.S. Cl..................................................... 210/232, 210/450
[51] Int. Cl...................................................... B01d 29/10
[50] Field of Search............................................. 210/450, 453, 19, 79, 106, 108, 448, 443, 407, 449, 460, 482

[56] References Cited
UNITED STATES PATENTS
| 870,727 | 11/1907 | Kneuper........................ | 210/19 |
| 3,353,678 | 11/1967 | Dragon......................... | 210/450 X |
| 3,460,682 | 8/1969 | Onufer.......................... | 210/448 |

Primary Examiner—Reuben Friedman
Assistant Examiner—T. A. Granger
Attorney—John W. Kraft ABSTRACT: An irrigation water screen comprising an upstanding cylindrical housing having an entranceway adapted to be connected to an irrigation water supply pipeline and a multiplicity of exitways in the housing, each exitway being adapted to receive a secondary water pipeline, a concentrically disposed cylindrical screen in the housing adapted to cover each of the exitways and having an inverted V-shaped bottom portion adjacent the entranceway in the housing, and a releasable flushing cap carried by the housing in the terminal end of the housing opposite the entranceway, one of the terminal ends of the caps being engageable with the cylindrical screen in the housing. The flushing cap is provided with a bulbouslike bell-shaped body adapted to be retained in the housing by a retaining spring ring urging against the uppermost shoulder of the cap formed by the body and a return position provided in the housing at the terminal end opposite the entranceway thereof. The flushing cap may be removed and replaced in the housing by pivoting the cap and articulating the lower recede portion of the cap body about the retaining spring ring in the housing to provide means by which the screen may be removed for cleaning. The flushing cap is provided with a wall in the end opposite the terminal end adjacent the screen in the housing when the cap is in place in the housing, the wall being provided with an exitway adapted to be connected to a commonly known water valve and being operable to flush the irrigation water screen of this invention while the irrigation water system to which it is attached is in operation.

PATENTED JAN 11 1972 3,633,752

ALFRED J. KURPGEWEIT INVENTOR

BY John W. Kraft 3,633,752

IRRIGATION WATER SCREEN

FIELD OF INVENTION

The present invention relates to irrigation water screens operable to filter sand and solid contaminates from irrigation distribution systems, and more particularly to an independent water screen which may be flushed while the system is in operation.

DESCRIPTION OF THE PRIOR ART

Water to irrigate large agricultural tracts of land is usually taken from natural streams and lakes or from manmade reservoirs through open canals. The flow of water in courses and conduits is generally at a very rapid rate in order to meet the irrigation demands in a given system. Therefore, the water tends to scour the banks and beds of its course or conduit and thereby carry with it large amounts of sands and silts therefrom. Water courses and conduits are usually open and are subjected to debris and solid contaminants carried through the air falling into the water courses and conduits. It is common practice to employ mechanical trash removing means to remove a substantial portion of debris in order to avoid obstructions in the course or conduits which may otherwise be caused by an accumulation of such debris. Since mechanical trash removal means itself tends to impede the flow of water a reasonable balance must be determined between the quantity and size of solid contaminants which may be removed and the power required for their removal which necessarily is working against the stream flow. Suffice it to say that in practice mechanical trash removal means generally employed are capable of removing only the larger particles of debris and solid contaminants.

Remaining debris and solid contaminants carried by the water tend to cause abrasive wear on mechanical operating components in a system such as pumps, mechanical sprinklers and the like, and may in addition cause such components as well as irrigation lines to malfunction because of clogging due to an obstruction in the components or lines. For this reason screens, generally of fine mesh wire, have commonly been placed in the entranceways to mechanical components and in the pipelines. In stopping the intrusion of debris and solid contaminants, the screens themselves tend to become obstructed. It is therefore necessary to frequently remove such screens and clean them. It has been found in the prior art to advantage to make such screens V-shaped at a lateral entrance or T in a pipeline because a turbulence is created in the water flow which tends to cause solid contaminant particles to become dislodged and pass by the entranceway. However, these screens must also be frequently cleaned. Since such screens are usually at a terminal connector in the system, it is necessary to shut down the system and disassemble the connector before cleaning.

Accordingly, it is a very important object of the present invention to provide in an irrigation water screen means by which the screen may be cleaned or flushed while the irrigation water system is in operation, and to provide an irrigation water screen which is structural independent of the irrigation water system and forming an ancillary component thereof.

A further object of this invention is to provide in an irrigation water screen means for quickly disassembling the screen while the irrigation water system is inoperative without disassembly of the system itself; to provide a water screen operable to remove solid contaminants at a point remote from any of several mechanical components; and to provide a water screen which is inexpensive and simple in its operation and structure.

These and further objects shall become more clearly apparent from the description of the preferred embodiment hereinafter set out, particularly when understood in connection with the drawings forming a part of this specification.

DETAILED DESCRIPTION OF THE PREFERRED EMBODIMENT

Figure 1:
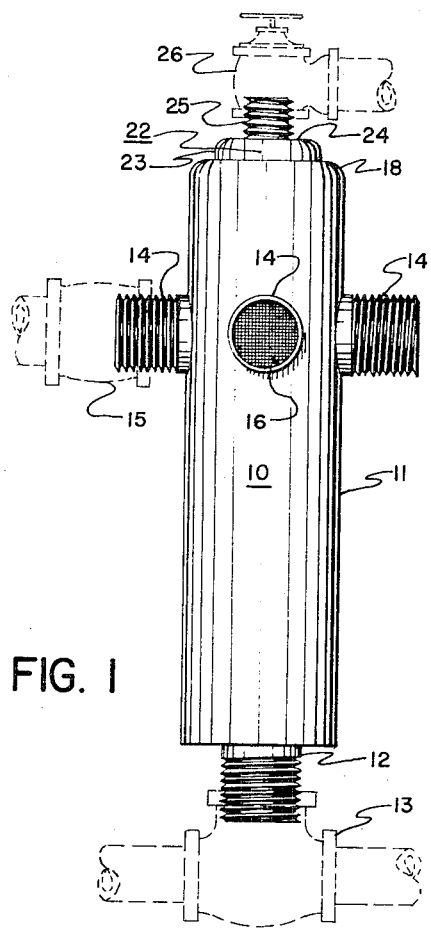
FIG. 1 is a side elevational view of the irrigation water screen of this invention showing a commonly known water valve in dotted lines threadably connected to the flushing cap thereof and the irrigation water screen threadably connected to a water supply pipeline shown in dotted lines for illustrative purposes.
Figure 2:
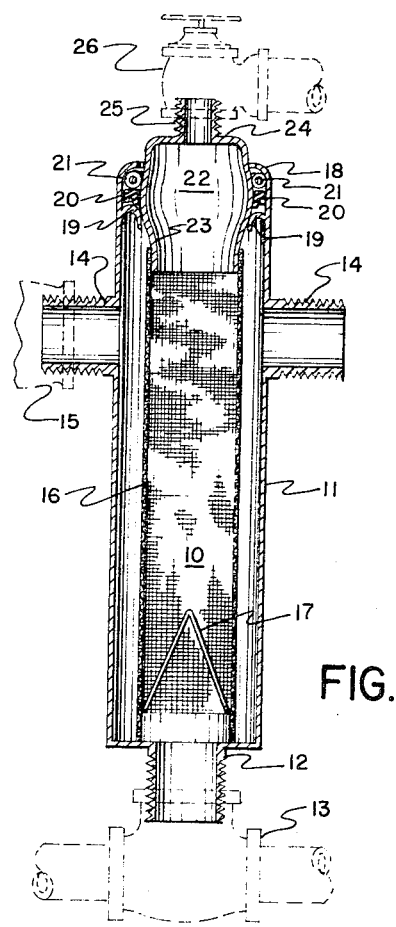
FIG. 2 is a cross-sectional elevational view with the filter screen in place and not being shown in cross section.
Figure 5:
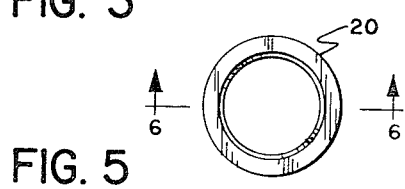
FIG. 5 is a plan view of the annular ring of the present invention.
Figure 6:
FIG. 6 is a cross-sectional elevational view of the annular ring of FIG. 5.

Referring now to the drawings and more particularly to FIGS. 1 and 2, the irrigation water screen of the present invention is shown to advantage and generally designated by the numeral 10. The irrigation water screen 10 comprises an upstanding cylindrical housing 11, having an entranceway 12 adapted to be threadably connected to an irrigation water supply pipeline 13 shown in dotted lines, and a multiplicity of exitways 14 in the housing, each exitway being adapted to threadably receive a secondary water pipeline 15 shown in dotted lines in FIG. 2. A centrally disposed cylindrical filter screen 16 is provided in the housing to cover each of the exitways thereof. The filter screen 16 is provided with an inverted V-shaped bar portion 17 shown to advantage in FIG. 2. The V-shaped portion 17 is adjacent the housing entranceway 12. The terminal end of the housing opposite the entranceway 12 issues inwardly toward the center of the housing to form a shoulder portion 18. A closure ring portion 19 is suitably connected to the inner wall of the housing and spaced downwardly with respect to the shoulder 18. A sealing ring 20 is carried by the closure portion 19 in the housing. An annular retaining spring 21 disposed between the sealing ring 20 and the shoulder 18 in the housing tends to hold the sealing ring in place. The sealing ring 20 is shown to advantage in FIGS. 5 and 6 and comprises compressible resilient material. The spring retainer ring 21 tends to urge the sealing ring 20 downwardly thereby causing the respective legs of the V-shaped sealing ring to be spread apart.

The irrigation water screen of the present invention includes a flushing cap member 22 having a bulbouslike bell-shaped body portion 23. The flushing cap is carried by the housing in the terminal end opposite the entranceway 12. One of the terminal ends of the body 23 is engageable with the filter screen 16, while a wall 24 is provided with an exitway 25 in the side opposite the screen engaging terminal ends. The exitway 25 is adapted to threadably receive a commonly known water valve 26 shown in dotted lines. The flushing cap 22 is held in the housing 11 by the retaining spring 21 urging against the uppermost shoulder of the cap 22 formed by the bulbouslike bell-shaped body 23. Water is sealed in the housing by the V-shaped annular sealing ring being urged downwardly and against the body portion 23 of the flushing cap 22.

Figure 3:
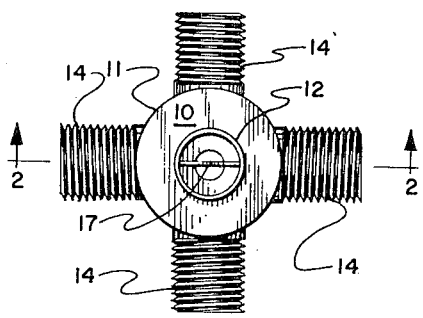
FIG. 3 is a bottom plan view of the present invention.
Figure 4:
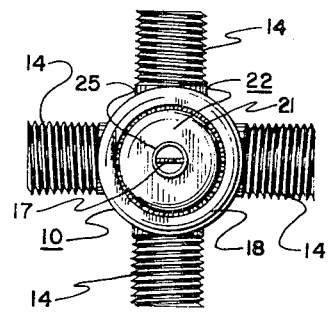
FIG. 4 is a top plan view.

Referring now to the FIG. 3, it will be noted that a bar 17 is disposed in the entranceway 12. It is generally known that a V-shaped filter bar such as the V-shaped portion 17 of the filter screen 16 when placed in an intersection of a pipeline such as that shown between the entranceway 12 and the water supply line 13, that the V-shaped portion tends to be self-cleaning in that a turbulence is caused by the V-shaped portion tending to cause accumulated solid particles in the water to be suspended in the water and carried on beyond the V-shaped portion 17. In practice it has been found that a bar such as 17 substantially increases the turbulence in the water flow in the entranceway 12 which tends to circulate solid particles and cause them to bypass the entranceway 12.

In operation it has been found to advantage to open the water valve 26 and flush from the water screen accumulated silts and sands that have passed through the V-shaped portion 17 and internal of the screen. In this manner means are provided by which the irrigation water screen may be flushed during the operation of the irrigation system thereby obviating the need to disassemble the system in order to clean the filter. It may be noted in the drawings that flushing cap 22 engages the filter screen 16 thereby causing solid contaminance in the screen to be retained thereby. Occasionally silts and fine particles tend to be embedded into the screen by the force of the water flowing through the screen. When this happens, the screen tends to become clogged. Therefore, I have provided means in combination with the housing whereby the flushing cap 22 may be pivoted to one side and articulated about the retaining spring 21 and the shoulder 18 of the upstanding housing 11. Hence, the cap may be removed and consequently the filter screen assembly 16 so that it may be cleaned. It is to be understood that the cap 22 and the screen 16 may only be removed from the housing 11 when the system is not in operation.

Having thus described a preferred embodiment of the invention which includes the teachings and principles therefor, it is to be appreciated and will be apparent to those skilled in the art that many physical changes could be made on the invention without altering the inventive concepts embodied therein. For example, any of a variety of commonly known filters could be used in place of the filter screen shown. Hence, it is intended that the scope of the invention be limited only to the extent indicated by the appended claims.

I claim:

1. An irrigation water screen comprising an upstanding cylindrical housing having an entranceway at one of its terminal ends adapted to be threadably connected to an irrigation water supply line, the opposite terminal end of said housing issuing inwardly with respect to the center of the housing to form a shoulder portion, and an annular ring suitably fastened to the inner wall of said housing and spaced below the shoulder portion of the housing; a spring-loaded sealing ring means disposed between said shoulder portion and said annular ring; a bell-shaped flushing cap issuing inwardly at one of its terminal ends to form a bulbouslike body portion having an exitway in a wall opposite said terminal end adapted to be threadably connected to a water valve, the said flushing cap being normally disposed in the housing and retained therein by the said spring-loaded sealing ring means urging inwardly against the upper shoulder portion formed by the bulbouslike body portion of the bell-shaped cap, said cap being removable therefrom by pivoting said cap to the lower recede portion of the bell-shaped cap and articulating the cap about the said sealing ring means; a multiplicity of laterally extending exitways disposed in the housing below the terminal end of said flushing cap operable to receive irrigation water pipelines, an upstanding cylindrical filter screen concentrically disposed in the housing having a V-shaped bottom bar portion adjacent the entranceway of said housing, said cylindrical screen extending from the terminal end of said housing adjacent said entranceway upwardly to the terminal end of said flushing cap and engageable therewith when said cap is in its normal place in said housing so that the screen covers said opposing exitways in said housing.

* * * * *